Figures 1, 3, 5, 7, 9, 11:
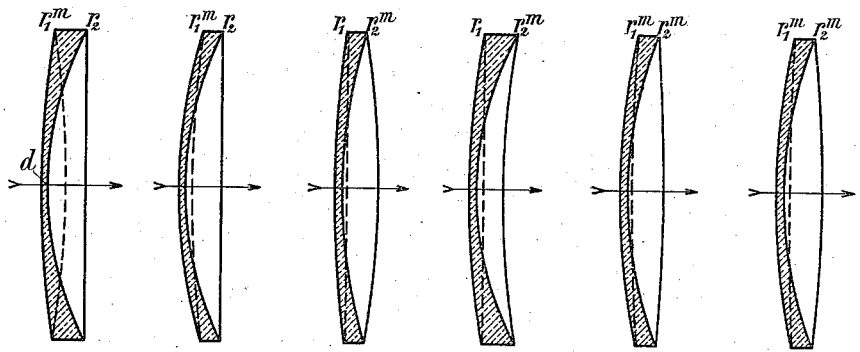

M. VON ROHR.
TORIC SPECTACLE GLASS.
APPLICATION FILED AUG. 25, 1910.

989,645.

Patented Apr. 18, 1911.

2 SHEETS—SHEET 1.

UNITED STATES PATENT OFFICE.

MORITZ VON ROHR, OF JENA, GERMANY, ASSIGNOR TO THE FIRM OF CARL ZEISS, OF JENA, GERMANY.

TORIC SPECTACLE-GLASS.

989,645.  Specification of Letters Patent. Patented Apr. 18, 1911.

Application filed August 25, 1910. Serial No. 578,863.

*To all whom it may concern:*

Be it known that I, MORITZ VON ROHR, a citizen of the German Empire, residing at Carl-Zeiss strasse, Jena, in the Grand Duchy of Saxe-Weimar, Germany, have invented a new and useful Toric Spectacle-Glass, of which the following is a specification.

The invention relates to spectacle glasses, which are intended to compensate the astigmatic defect of an eye by means of similar but opposite astigmatism, namely to toric glasses, both sphero-toric and bitoric. In the sphero-toric glasses the center of the spherical surface lies in the equatorial plane of the toric surface. The axis of the glass lies in this equatorial plane, contains the above mentioned center and intersects the axis of the toric surface. With the bi-toric glasses two cases are to be distinguished. The axes of the two toric surfaces can lie parallel to each other. But they can also cross one another at right angles. In the case of the parallel axes the equatorial plane is common to both surfaces and the axis of the glass lies in this plane and intersects the axes of both surfaces. In the case of the axes which cross one another at right angles, the two equatorial planes are perpendicular to each other. Their line of intersection is the axis of the glass. All toric glasses belong to the bi-symmetrical ones, *i. e.* to those with two planes of symmetry, which intersect at right angles in the axis of the glass. With the sphero-toric glasses and the bi-toric ones with parallel axes, the one plane of symmetry is formed by the equatorial plane of the toric surface or surfaces respectively, the other by that meridional plane of the toric surface or surfaces respectively which contains the axis of the glass. With the bi-toric glasses, in which the axes of the toric surfaces cross one another at right angles, the two equatorial planes of these surfaces represent the planes of symmetry.

The object of the invention is to bring the deficient optical effect of the zones of the toric glass as near as possible to the correct effect of its vertex place. From this correct effect, according to the investigations which led to the invention, the average effect of a zone, in each toric spectacle glass, deviates more than the mean of the two effects, which appertain to two places of the zone, chosen as will be now described. For this choice the four places come into consideration, in which the planes of symmetry intersect the zone. As the diametrically opposed places are equal in their effect, the above proposition concerns either one of the two places, which are intersected by the one, and either one of the two places, which are intersected by the other plane of symmetry. Further, the average effect of a zone is so much the better, it approximates so much nearer to the effect of the vertex place, the less the mean of the two effects of two places in this zone, chosen as stated, deviates from the effect of the vertex places, this mean being, according to the first proposition, always better than that average effect.

In order to ascertain the effect of a place, which belongs to a plane of symmetry, the place is to be considered as one through which a principal ray passes, which travels in the plane of symmetry and intersects the axis about 3 cm. behind the eye side vertex of the spectacle glass, *i. e.* where in the practical use of the spectacle glass the point of rotation of the eye is situated. In the vertex place of the glass, which belongs to both planes of symmetry, the axis represents the principal ray. For any place whatever in the toric spectacle glass the optical effect results from the two different powers, which are effective in the two principal planes belonging to the principal ray. The principal planes are perpendicular to each other, as is well-known. When the place under consideration lies in a plane of symmetry, this plane represents the one principal plane. For the vertex place both planes of symmetry become principal planes. If for a place outside the vertex, lying in one of the two planes of symmetry, of the two powers the one, which is effective in this plane of symmetry, were just as great as the power, which is effective in the same plane at the vertex place, and if further for the place under consideration the other power, which, according to the above, is effective in a plane perpendicular to this same plane, were also similar to the power, which belongs to the vertex place in the other plane of symmetry, then the effect of the place under consideration would completely equal the effect of the vertex. Should the same also hold good for a place in the same zone in the other plane of symmetry, the above mentioned mean would not deviate at all from the effect of the vertex place, and so the optimum for the average effect of the zone would be attained.

A toric spectacle glass of the just described optical characteristics cannot be realized. According to the invention a toric glass approaches nearest to this ideal, when the effects of two places in a zone, which are intersected respectively by the one and the other plane of symmetry, are approximately equal to each other. Toric glasses fulfilling this requirement are not known. The examination of existing toric glasses has always shown instead of approximate similarity a considerable divergence between the two effects here considered. Each of the two nearly similar effects already represents approximately the mean, of which it was ascertained above, that it approximates more closely to the effect of the vertex place than does the average effect of the zone, to which the two places belong. But at the same time the two nearly similar effects approximate more closely to the effect of the vertex place than does the mean, which results in any given case, where the effects of the two places differ considerably. Accordingly the average effect of the zone approximates more closely to the above mentioned optimum than can be the case, when the effects of the two places in the zone differ considerably.
Exact similarity between the effects of two places in a zone, which are intersected respectively by the one and the other plane of symmetry, exists then, when the two powers of the one place equal the two powers of the other. In this case the difference between the two powers, i. e. the measure of the astigmatism (the astigmatic difference) is the same for both places. According to the invention the similarity of the astigmatic differences, with the exception of particularly powerful collective glasses, can be attained accurately at least for one zone, e. g. the marginal zone. The agreement of either power of the one place with the corresponding ing power of the other place, which would still be requisite in order to make the effects of the two places exactly similar, cannot be realized. But even for the marginal zone the difference between the corresponding powers in both cases need not by a long way amount to the fifth part of the astigmatic difference at the vertex place. The difference in the sharpness of the image when using both marginal places, which corresponds to a difference of the powers of the said magnitude, need not be taken into consideration from a practical point of view, because in the use of the marginal zone a much greater lack of sharpness occurs in consequence of the chromatic aberrations. A power of the one place and a power of the other place correspond to one another, when the one power acts in the plane of symmetry, which intersects its place, the other in the plane, which is perpendicular to the other plane of symmetry.

Figures 2, 4, 6, 8, 10, 12:
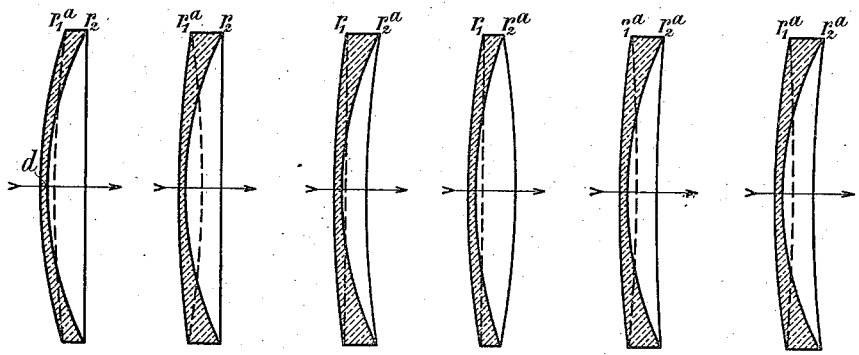
Figures 13, 15, 17, 19, 21, 23:
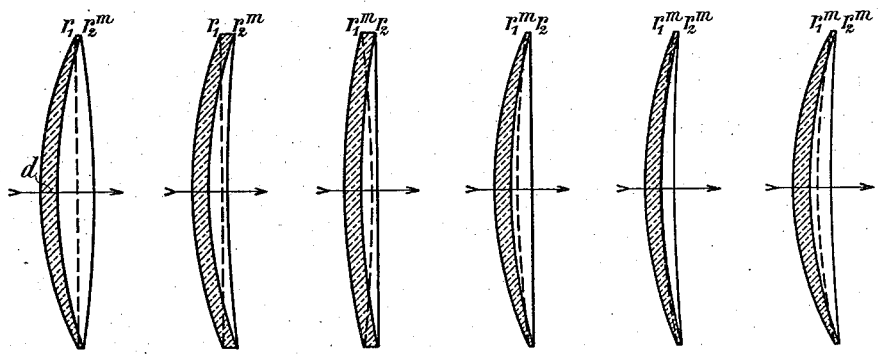
Figures 14, 16, 18, 20, 22, 24:
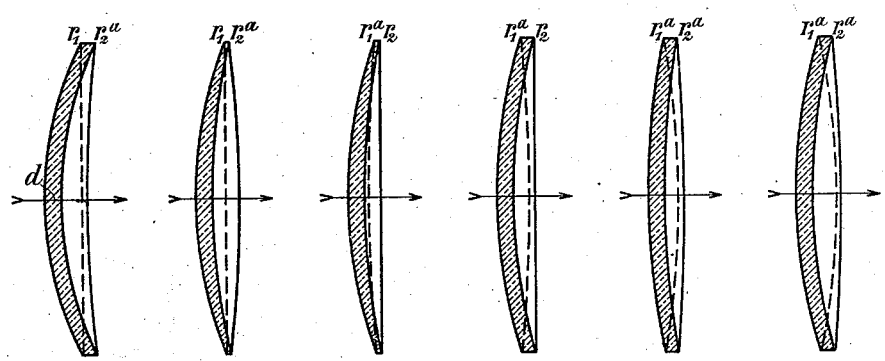

In the annexed drawing: Figure 1 is a section along one plane of symmetry of a sphero-toric dispersive spectacle glass constructed according to the invention. Fig. 2 is a section along the other plane of symmetry. Fig. 3 is a section along one plane of symmetry of a second form of sphero-toric dispersive glass. Fig. 4 is a section along the other plane of symmetry. Fig. 5 is a section along one plane of symmetry of a third form of sphero-toric dispersive glass. Fig. 6 is a section along the other plane of symmetry. Fig. 7 is a section along one plane of symmetry of a fourth form of sphero-toric dispersive glass. Fig. 8 is a section along the other plane of symmetry. Fig. 9 is a section along one plane of symmetry of a bi-toric dispersive glass, the toric surfaces of which have parallel axes. Fig. 10 is a section along the other plane of symmetry. Fig. 11 is a section along one plane of symmetry of a bi-toric dispersive glass, the toric surfaces of which have axes which cross each other at right angles. Fig. 12 is a section along the other plane of symmetry. Fig. 13 is a section along one plane of symmetry of a sphero-toric collective glass. Fig. 14 is a section along the other plane of symmetry. Fig. 15 is a section along one plane of symmetry of a second form of spherotoric collective glass. Fig. 16 is a section along the other plane of symmetry. Fig. 17 is a section along one plane of symmetry of a third form of sphero-toric collective glass. Fig. 18 is a section along the other plane of symmetry. Fig. 19 is a section along one plane of symmetry of a fourth form of sphero-toric collective glass. Fig. 20 is a section along the other plane of symmetry. Fig. 21 is a section along one plane of symmetry of a bi-toric collective glass, the toric surfaces of which have parallel axes. Fig. 22 is a section along the other plane of symmetry. Fig. 23 is a section along one plane of symmetry of a bi-toric collective glass, the toric surfaces of which have axes which cross each other at right angles. Fig. 24 is a section along the other plane of symmetry.

Each glass is assumed to be of a circular form, in order to indicate, that with a horizontal axis the pair of planes of symmetry may be located as desired.

In the following tables there are given for each example first of all the two powers prescribed, and realized at the vertex place, viz. M for the one plane of symmetry, the M-plane, corresponding to the upper figure, and A for the other plane of symmetry, the A-plane, corresponding to the lower figure. Then follow the radii $r$ and the vertex thickness $d$. A radius of the front surface has below it the index 1, a radius of the hinder surface has in the same place the index 2. If the surface is a toric one, its two radii are also marked by an upper index, by $m$, when the radius is that of the M-plane, by $a$, when the radius is the one in the A-plane. By the suitable coördination of M and A to the one and the other plane of symmetry, the index $m$ signifies for each toric surface—excepting the hinder surface of the bi-toric glasses, the axes of which cross each other at right angles—at the same time the meridional radius, the index $a$ the equatorial radius. For the said hinder surface, on the other hand, $m$ indicates the equatorial radius and $a$ the meridional radius. Each table contains also for a middle zone and for the marginal zone, which are both characterized by the angles of inclination $w'$ of the principal ray on the eye side, the point of intersection of the principal rays having a distance of 25 mm. from the hinder vertex of the glass, the following data. Firstly, the power $M^m$ of that place in the zone which is intersected by the M-plane, being effective in this same plane, the power $A^m$ of the same place, being effective in the principal plane perpendicular to the M-plane, and the astigmatic difference $M^m - A^m$ of the place under consideration. Secondly, the power $M^a$ of the place in the zone, intersected by the A-plane, being effective in the principal plane perpendicular to that plane, the power $A^a$ of the same place, being effective in the A-plane, and the astigmatic difference $M^a - A^a$. Thirdly, the differences $M^m - M^a$ and $A^m - A^a$ of the corresponding powers of both places. The values for the vertex place ($w' = 0°$) are in each case added, $$M^m_{w'=0°} = M^a_{w'=0°} \text{ and } A^m_{w'=0°} = A^a_{w'=0°}$$

again representing the two powers M and A prescribed for the glass. Finally there is given, what fractional part the differences $$M^m_{w'max} - M^a_{w'max} \text{ and } A^m_{w'max} - A^a_{w'max}$$

of corresponding powers of the places under consideration in the marginal zone constitute of the prescribed astigmatic difference $M - A$. The refractive index $n_D$ is for all 12 examples 1.52. Each power relates to that point of the principal ray belonging to it on the eye side, which like the hinder vertex of the glass has a distance of 25 mm. from the point of intersection of the principal rays. According to the strict sense of the term "power" the hinder principal point of the glass in each case should have served as the starting-point. But on account of the very small distance of the same from the hinder vertex the two refraction values do not differ practically.

I. DISPERSIVE GLASSES.

*Figs. 1 and 2.*

$M = -8$ dptr.  $A = -4$ dptr.
$r^m_1 = 127.3$ mm.  $r^a_1 = 64.5$ mm.  $r_2 = 43.0$ mm.  $d = 0.5$ mm.

| | | | |
|---|---|---|---|
| $w' =$ | 0.00° | 20.70° | 30.00° |
| $M^m =$ | −8.00 dptr. | −7.82 dptr. | −7.54 dptr. |
| $A^m =$ | −4.00 " | −3.66 " | −3.23 " |
| $M^m - A^m =$ | 4.00 " | 4.16 " | 4.31 " |
| $M^a =$ | −8.00 " | −7.95 " | −7.90 " |
| $A^a =$ | −4.00 " | −3.83 " | −3.60 " |
| $M^a - A^a =$ | 4.00 " | 4.12 " | 4.30 " |
| $M^m - M^a =$ | 0.00 " | 0.13 " | 0.36 " = 0.09 (M−A) |
| $A^m - A^a =$ | 0.00 " | 0.17 " | 0.37 " = 0.09 (M−A) |

*Figs. 3 and 4.*

$M = -4$ dptr.  $A = -8$ dptr.
$r^m_1 = 67.6$ mm.  $r^a_1 = 140.3$ mm.  $r_2 = 44.4$ mm.  $d = 0.5$ mm.

| | | | |
|---|---|---|---|
| $w' =$ | 0.00° | 20.70° | 30.00° |
| $M^m =$ | −4.00 dptr. | −3.81 dptr. | −3.63 dptr. |
| $A^m =$ | −8.00 " | −7.93 " | −7.95 " |
| $M^m - A^m =$ | 4.00 " | 4.17 " | 4.32 " |
| $M^a =$ | −4.00 " | −3.69 " | −3.31 " |
| $A^a =$ | −8.00 " | −7.87 " | −7.63 " |
| $M^a - A^a =$ | 4.00 " | 4.18 " | 4.32 " |
| $M^m - M^a =$ | 0.00 " | 0.12 " | 0.32 " = 0.08 (M−A) |
| $A^m - A^a =$ | 0.00 " | 0.11 " | 0.32 " = 0.08 (M−A) |

*Figs. 5 and 6.*

$M = -4$ dptr.  $A = -8$ dptr.
$r_1 = 142.0$ mm.  $r^m_2 = 67.8$ mm.  $r^a_2 = 44.6$ mm.  $d = 0.7$ mm.

| | | | |
|---|---|---|---|
| $w' =$ | 0.00° | 20.70° | 30.00° |
| $M^m =$ | −4.00 dptr. | −4.08 dptr. | −4.11 dptr. |
| $A^m =$ | −8.00 " | −8.04 " | −8.08 " |
| $M^m - A^m =$ | 4.00 " | 3.96 " | 3.97 " |
| $M^a =$ | −4.00 " | −3.87 " | −3.71 " |
| $A^a =$ | −8.00 " | −7.87 " | −7.64 " |
| $M^a - A^a =$ | 4.00 " | 4.00 " | 3.93 " |
| $M^m - M^a =$ | 0.00 " | 0.21 " | 0.40 " = 0.10 (M−A) |
| $A^m - A^a =$ | 0.00 " | 0.17 " | 0.44 " = 0.11 (M−A) |

*Figs. 7 and 8.*

$M = -8$ dptr.  $A = -4$ dptr.
$r_1 = 110.0$ mm.  $r^m_2 = 40.8$ mm.  $r^a_2 = 59.5$ mm.  $d = 0.7$ mm.

| | | | |
|---|---|---|---|
| $w' =$ | 0.00° | 20.70° | 30.00° |
| $M^m =$ | −8.00 dptr. | −7.75 dptr. | −7.40 dptr. |
| $A^m =$ | −4.00 " | −3.77 " | −3.49 " |
| $M^m - A^m =$ | 4.00 " | 3.98 " | 3.91 " |
| $M^a =$ | −8.00 " | −7.96 " | −7.89 " |
| $A^a =$ | −4.00 " | −4.00 " | −3.95 " |
| $M^a - A^a =$ | 4.00 " | 3.96 " | 3.94 " |
| $M^m - M^a =$ | 0.00 " | 0.21 " | 0.49 " = 0.12 (M−A) |
| $A^m - A^a =$ | 0.00 " | 0.23 " | 0.46 " = 0.12 (M−A) |

*Figs. 9 and 10.*

$M = -4$ dptr.  $A = -8$ dptr.
$r^m_1 = 92.4$ mm.  $r^a_1 = 152.9$ mm.  $r^m_2 = 53.9$ mm.  $r^a_2 = 45.6$ mm.
$d = 0.7$ mm.

| | | | |
|---|---|---|---|
| $w' =$ | 0.00° | 20.70° | 30.00° |
| $M^m =$ | −4.01 dptr. | −3.95 dptr. | −3.84 dptr. |
| $A^m =$ | −8.00 " | −8.01 " | −8.02 " |
| $M^m - A^m =$ | 3.99 " | 4.06 " | 4.18 " |
| $M^a =$ | −4.01 " | −3.79 " | −3.50 " |
| $A^a =$ | −8.00 " | −7.90 " | −7.68 " |
| $M^a - A^a =$ | 3.99 " | 4.11 " | 4.18 " |
| $M^m - M^a =$ | 0.00 " | 0.16 " | 0.34 " = 0.09 (M−A) |
| $A^m - A^a =$ | 0.00 " | 0.11 " | 0.34 " = 0.09 (M−A) |

*Figs. 11 and 12.*

$M = -4$ dptr.  $A = -8$ dptr.
$r^m_1 = 92.4$ mm.  $r^a_1 = 113.4$ mm.  $r^m_2 = 53.9$ mm.  $r^a_2 = 41.3$ mm.
$d = 0.7$ mm.

| | | | |
|---|---|---|---|
| $w' =$ | 0.00° | 20.70° | 30.00° |
| $M^m =$ | −4.01 dptr. | −3.95 dptr. | −3.84 dptr. |
| $A^m =$ | −8.00 " | −7.97 " | −7.90 " |
| $M^m - A^m =$ | 3.99 " | 4.02 " | 4.06 " |
| $M^a =$ | −4.01 " | −3.75 " | −3.44 " |
| $A^a =$ | −8.00 " | −7.77 " | −7.43 " |
| $M^a - A^a =$ | 3.99 " | 4.02 " | 3.99 " |
| $M^m - M^a =$ | 0.00 " | 0.20 " | 0.40 " = 0.10 (M−A) |
| $A^m - A^a =$ | 0.00 " | 0.20 " | 0.47 " = 0.12 (M−A) |

II. COLLECTIVE GLASSES.

*Figs. 13 and 14.*

$M = +4$ dptr.  $A = +1$ deptr.
$r_1 = 43.2$ mm.  $r^m_2 = 63.1$ mm.  $r^a_2 = 46.3$ mm.  $d = 1.9$ mm.

| | | | |
|---|---|---|---|
| $w' =$ | 0.00° | 23.93° | 35.00° |
| $M^m =$ | +3.97 dptr. | +3.79 dptr. | +3.54 dptr. |
| $A^m =$ | +0.99 " | +0.70 " | +0.35 " |
| $M^m - A^m =$ | 2.98 " | 3.09 " | 3.19 " |
| $M^a =$ | +3.97 " | +3.96 " | +3.94 " |
| $A^a =$ | +0.99 " | +0.87 " | +0.73 " |
| $M^a - A^a =$ | 2.98 " | 3.09 " | 3.21 " |
| $M^m - M^a =$ | 0.00 " | 0.17 " | 0.40 " = 0.13 (M−A) |
| $A^m - A^a =$ | 0.00 " | 0.17 " | 0.38 " = 0.13 (M−A) |

Figs. 15 and 16.

$M = +1$ dptr.    $A = +4$ dptr.
$rm_1 = 53.0$ mm.    $rm_2 = 58.1$ mm.    $ra_2 = 87.7$ mm.    $d = 1.9$ mm.

| $w' =$ | 0.00° | 23.93° | 35.00° | |
|---|---|---|---|---|
| $M^m =$ | +0.98 dptr. | +0.90 dptr. | +0.76 dptr. | |
| $A^m =$ | +4.00 " | +4.06 " | +4.13 " | |
| $M^m - A^m =$ | 3.02 " | 3.16 " | 3.37 " | |
| $M^a =$ | +0.98 " | +0.77 " | +0.51 " | |
| $A^a =$ | +4.00 " | +3.99 " | +3.87 " | |
| $M^a - A^a =$ | 3.02 " | 3.22 " | 3.36 " | |
| $M^m - M^a =$ | 0.00 " | 0.13 " | 0.25 " | $= 0.08$ (M—A) |
| $A^m - A^a =$ | 0.00 " | 0.07 " | 0.26 " | $= 0.09$ (M—A) |

Figs. 17 and 18.

$M = +1$ dptr.    $A = +4$ dptr.
$rm_1 = 84.5$ mm.    $ra_1 = 57.2$ mm.    $r_2 = 100.0$ mm.    $d = 1.9$ mm.

| $w' =$ | 0.00° | 23.93° | 35.00° | |
|---|---|---|---|---|
| $M^m =$ | +1.01 dptr. | +1.02 dptr. | +1.01 dptr. | |
| $A^m =$ | +4.00 " | +4.11 " | +4.26 " | |
| $M^m - A^m =$ | 2.99 " | 3.09 " | 3.25 " | |
| $M^a =$ | +1.01 " | +0.89 " | +0.74 " | |
| $A^a =$ | +4.00 " | +4.03 " | +4.00 " | |
| $M^a - A^a =$ | 2.99 " | 3.14 " | 3.26 " | |
| $M^m - M^a =$ | 0.00 " | 0.13 " | 0.27 " | $= 0.12$ (M—A) |
| $A^m - A^a =$ | 0.00 " | 0.08 " | 0.26 " | $= 0.12$ (M—A) |

Figs. 19 and 20.

$M = +4$ dptr.    $A = +1$ dptr.
$rm_1 = 48.0$ mm.    $ra_1 = 65.6$ mm.    $r_2 = 74.5$ mm.    $d = 1.9$ mm.

| $w' =$ | 0.00° | 23.93° | 35.00° | |
|---|---|---|---|---|
| $M^m =$ | +4.00 dptr. | +3.90 dptr. | +3.71 dptr. | |
| $A^m =$ | +1.02 " | +0.82 " | +0.57 " | |
| $M^m - A^m =$ | 2.98 " | 3.08 " | 3.14 " | |
| $M^a =$ | +4.00 " | +4.04 " | +4.06 " | |
| $A^a =$ | +1.02 " | +0.98 " | +0.91 " | |
| $M^a - A^a =$ | 2.98 " | 3.06 " | 3.15 " | |
| $M^m - M^a =$ | 0.00 " | 0.14 " | 0.35 " | $= 0.12$ (M—A) |
| $A^m - A^a =$ | 0.00 " | 0.16 " | 0.34 " | $= 0.12$ (M—A) |

Figs. 21 and 22.

$M = +4$ dptr.    $A = +1$ dptr.
$rm_1 = 50.8$ mm.    $ra_1 = 96.00$ mm.    $rm_2 = 81.7$ mm.    $ra_2 = 116.8$ mm.
$d = 1.9$ mm.

| $w' =$ | 0.00° | 23.93° | 35.00° | |
|---|---|---|---|---|
| $M^m =$ | +4.00 dptr. | +3.94 dptr. | +3.80 dptr. | |
| $A^m =$ | +1.00 " | +0.86 " | +0.68 " | |
| $M^m - A^m =$ | 3.00 " | 3.08 " | 3.12 " | |
| $M^a =$ | +4.00 " | +4.08 " | +4.16 " | |
| $A^a =$ | +1.00 " | +1.04 " | +1.06 " | |
| $M^a - A^a =$ | 3.00 " | 3.04 " | 3.10 " | |
| $M^m - M^a =$ | 0.00 " | 0.14 " | 0.36 " | $= 0.12$ (M—A) |
| $A^m - A^a =$ | 0.00 " | 0.18 " | 0.38 " | $= 0.13$ (M—A) |

Figs. 23 and 24.

$M = +4$ dptr.    $A = +1$ dptr.
$rm_1 = 40.0$ mm.    $ra_1 = 67.0$ mm.    $rm_2 = 56.4$ mm.    $ra_2 = 76.0$ mm.
$d = 1.9$ mm.

| $w' =$ | 0.00° | 23.93° | 35.00° | |
|---|---|---|---|---|
| $M^m =$ | +4.00 dptr. | +3.78 dptr. | +3.49 dptr. | |
| $A^m =$ | +1.00 " | +0.75 " | +0.46 " | |
| $M^m - A^m =$ | 3.00 " | 3.03 " | 3.03 " | |
| $M^a =$ | +4.00 " | +3.98 " | +3.95 " | |
| $A^a =$ | +1.00 " | +0.96 " | +0.90 " | |
| $M^a - A^a =$ | 3.00 " | 3.02 " | 3.05 " | |
| $M^m - M^a =$ | 0.00 " | 0.20 " | 0.46 " | $= 0.15$ (M—A) |
| $A^m - A^a =$ | 0.00 " | 0.21 " | 0.44 " | $= 0.15$ (M—A) |

I claim:

1. Toric spectacle glass, in which the powers effective in the places of the marginal zone, through which pass two principal rays traveling respectively in the one and the other plane of symmetry and intersecting at the same inclination to the axis in the same axis point, about 3 cm. behind the vertex on the eye side, have such values, that the difference between that one of the two powers of one of the two places, which is effective in the plane of symmetry intersecting this place, and the power of the other place, being effective in the principal plane perpendicular to that plane of symmetry, which intersects this other place, amounts to the fifth part at the most of the astigmatic difference at the vertex.

2. Toric spectacle glass, in which the powers effective in the places of the marginal zone, through which pass two principal rays traveling respectively in the one and the other plane of symmetry and intersecting at the same inclination to the axis in the same axis point, about 3 cm. behind the vertex on the eye side, have such values, that the difference between that one of the two powers of one of the two places, which is effective in the plane of symmetry intersecting this place, and the power of the other place, being effective in the principal plane perpendicular to that plane of symmetry, which intersects this other place, amounts to the fifth part at the most of the astigmatic difference at the vertex, the astigmatic difference at one place and that at the other place being the same.

MORITZ VON ROHR.

Witnesses:
PAUL KRÜGER,
ALFRED MECKEDANZ.

---

Copies of this patent may be obtained for five cents each, by addressing the "Commissioner of Patents, Washington, D. C."